Figure 1:
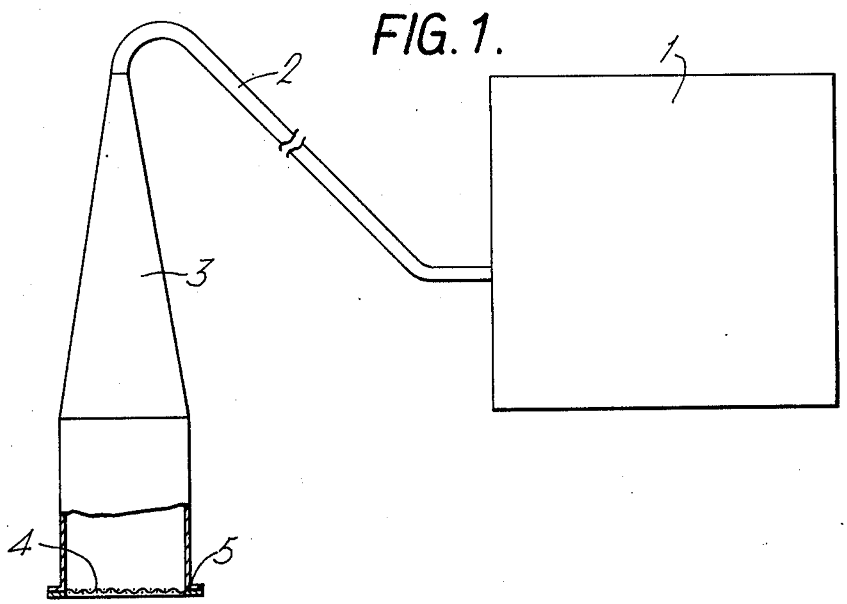

United States Patent [19]

Roberts et al.

[11] 4,020,643

[45] May 3, 1977

[54] ICE CONFECTION

[75] Inventors: Clive Arnold Roberts, Oakley; Jennifer Joan Scott nee Reid, Wellingborough; Michael John Willis, Bedford, all of England

[73] Assignee: Thomas J. Lipton, Inc., Englewood Cliffs, N.J.

[22] Filed: Feb. 27, 1975

[21] Appl. No.: 553,749

[30] Foreign Application Priority Data

Mar. 1, 1974 United Kingdom ............... 9395/74

[52] U.S. Cl. ................................. 62/322; 425/199; 426/104; 426/516; 426/565; 426/566; 426/567

[51] Int. Cl.$^2$ ........................................ F25B 25/00

[58] Field of Search ........... 426/104, 516, 565–567, 426/249; 264/176; 425/197–199; 62/322

[56] References Cited

UNITED STATES PATENTS

| | | | |
|---|---|---|---|
| 2,914,005 | 11/1959 | Gorozpe | 426/516 X |
| 3,205,673 | 9/1965 | Soderberg | 62/354 X |
| 3,487,144 | 12/1969 | Sarian | 264/176 F X |
| 3,506,753 | 4/1970 | Flamand | 425/198 X |
| 3,802,821 | 4/1974 | Mott | 425/198 X |
| 3,900,546 | 8/1975 | Kaukeinen | 425/198 X |

FOREIGN PATENTS OR APPLICATIONS

| | | |
|---|---|---|
| 501,863 | 3/1939 | United Kingdom |

*Primary Examiner*—William E. Wayner
*Assistant Examiner*—William E. Tapolcai, Jr.
*Attorney, Agent, or Firm*—Brumbaugh, Graves, Donohue & Raymond

[57] ABSTRACT

Ice confections are extruded through a multiplicity of holes. Unevenness of flow during extrusion is reduced. The holes can be arranged in an array to determine the cross-section of the extruded ice confection. Extruded ice confections can be readily prepared with, in cross-section, very fine detail e.g. key-shaped, or heart-shaped or containing air passages.

6 Claims, 11 Drawing Figures

ICE CONFECTION

The invention relates to an ice confection extrusion process, an ice confection freezer and an extrusion head.

Ice confections in fancy shapes have considerable appeal to consumers. Examples are ice confections bars that in cross-section are shaped like a heart or like a key. Such products are at present normally made by shaping a metal extrusion feed to a nozzle of the particular desired shape. Conventionally the taper of the extrusion feed to the nozzle has to be very gradual. This is to avoid, it is believed, too great unevenness in the flow of the ice confection. This method has disadvantages: it is labour-intensive in manufacture of the extrusion feed; it does not lend itself to easy change from one shape to another; the tapered feed is cumbersome; and during extrusion distortion occurs because of unevenness of flow and fine detail in the desired shape is lost.

It has now been found that unevennes of flow during extrusion can at least be reduced by extruding the ice confection for instance through a 5 TO 80 British Standard mesh. The mesh reduces the unevenness of flow arising during extrusion and in particular caused by any severe reductions or increases in the cross-section of the extrusion passage upstream from the mesh. Higher throughputs and shorter residence times can be achieved. Use of sharply tapering tubes saves factory space and avoids the labour-intensive practice indicated above. Unevenness of flow has disadvantages even in the extrusion of a conventional, rectangular bar since it can cause bulging or distortion in the leading face of the extruded product.

Since the essential feature of a mesh is that it contains a multiplicity of holes, the invention provides an ice confection extrusion process in which the ice confection is extruded through a multiplicity of holes in a first plate, each hole having a surface area, at the leading face of the plate, in the range displayed by the holes in 5 to 80 British Standard mesh. The plate, of course, has to be capable of resisting the extrusion pressure and any structure that can do this and contains a multiplicity of holes can be used as the plate; for example, the plate need not be smooth on either side.

Preferably the holes in the plate are so closely spaced that the ice confection extruded through any one hole coalesces at least with the ice confection extruded through the nearest neighbour hole. When the holes are not so close, coalescence can be achieved by for instance the operator blocking the flow of the extruded ice confection for a short time. Normally there is no difficulty in ensuring that appropriate coalescence of the ice confection after extrusion occurs: on release from the extrusion-pressure the ice confection expands and it is a simple matter to choose or to make a plate in which the holes are sufficiently close to each other for the ice confection to coalesce appropriately. The type and particular ingredients of the ice confection used and in particular the amount of overrun in the ice confection are factors to be considered. This is because they affect the amount of expansion that occurs on extrusion. With holes circular in cross-section it will be noted that the maximum distance between the centres of two nearest neighbour holes for coalescence to occur will at the most not be more than twice their combined radii, even with ice cream mix containing 300% overrun. Coalescence can occur with zero overrun.

Some improvement in flow characeristics, i.e. more even flow, is achieved wherever the plate is situated but the improvement is most useful when the plate is at the extrusion end of an extrusion head. When a plate is in this position it is strongly preferred that the extruded ice confection coalesces at least between nearest neighbouring holes.

Extrusion of an ice confection through a multiplicity of holes is advantageous even in its simple form but becomes much more significant when a further advance is made. This further advance lies in the appreciation that hols in a plate at the end of the extrusion head can be in the form of an array which will define the cross-section of the extruded ice confection and that the array, and the cross-section of the extruded ice confection, need not be similar to that of the extrusion end of the extrusion head. (Similar is used as in geometry to mean the same shape but not necessarily the same size.)

By this means ice confections can be extruded with cross-sections differing from that of conventional extrusion nozzles without the difficulties inherent in the conventional tapering of the cross-section of the extrusion nozzle to the desired cross-section. Further advantages are that ice confections can be extruded with more complex cross-sections than the conventional tapering procedure permits; a wide range of cross-sections can be produced merely by using a range of plates or by altering the array of holes in the plate by blocking some holes out; and finer detail and more elaborate cross-sections can be followed than in conventional, nozzle extrusion. The amount of detail that can be followed when the holes have surface areas greater than the holes displayed by British Standard mesh 10 is adequate for some purposes but preferably the holes should have surface areas in the range displayed by British Standard meshes 10 to 80. The lower limit for hole-sized is due to the fact that for most ice confections extrusion through holes smaller than those of British Standard mesh 80 becomes impossible; the holes block too readily. For an array to define the cross-section of the extruded ice confection it is not absolutely necessary for the plate to be at the immediate end of the extrusion head. This is particuarly so when extrusion is vertically downwards. Also the plate need not be at the immediate end of the extrusion head if the geometry of the extrusion head and the consistency — firmness — of the ice confection is adequate. However the immediate end is preferred.

An especially significant aspect of the invention is therefore an ice confection extrusion process in which the ice confection is extruded through a mulitiplicity of holes in a first plate at the extrusion end of an extrusion head, which holes are so closely spaced that the ice confection extruded through any one hole coalesces at least with the ice confection extruded through the nearest neighbour hole and are arranged in an array, which defines the cross-section of the ice confection parallel to the plate and is not similar to that of the extrusion end of the extrusion head. (The plate is called a first plate to distinguish it from another plate used in a preferred modification described below. An array is an ordered arrangement.)

As mentioned above, one advantage of such a process is that finer detail and more elaborate cross-sections can be followed than with conventional, nozzle extrusion. In general the array can be fancy i.e., ornamental, not plain. In a preferred aspect of the invention the array is fancy and is such that the extruded ice confection contains at least one longitudinal air passage. Ice confections containing more than one air passage, regardless of the method of preparation, are preferred forms of the invention described in our copending application of same date Ser. No. 553,748 (e.g.U.K. No. 9396/74). To achieve one air passage in the ice confection there should be an adequately large area within the array containing no holes. This can be achieved, for instance with a mesh, by blocking off appropriate holes so that on extrusion coalescence of the ice confection across such a blocked-off area does not occur.

When the extruded ice confection contains a longitudinal air passage the extruded ice confection is preferably cut into bars at the leading face of the plate conveniently by a wire or wires. The risk that the air passage becomes occluded is reduced. An advantage of an ice confection containing a longitudinal air passage is that it can more readily be broken, for instance with a spoon, than the same ice confection not containing an air passage. Thereby the ice confection containing an air passage can be eaten more readily straight from a deep-freeze (-18° C normally) than can the corresponding conventional product. To achieve this advantage and the advantage of warm-eating, due to readier warming-up, of the ice confection with open passages, the walls between nearest neighbour air passages are preferably less than 5 cms thick, particularly preferably less than 1 cm thick. To give improved structural stability the distance between the outer air passages and the parallel exterior of the ice confection can conveniently be greater than the thickness of the walls between air passages but the distance should preferably be less than 5 cms. To obtain preferred levels of structural stability both this distance and the thickness of the walls should preferably be at least 0.1 cm. The area or areas within the array containing no holes, which areas ensure that the extruded ice confection contains at least one air passage, should, in these preferred forms of the invention, be such that the walls meet these requirements on thickness.

A problem with the process of the invention as described so far is that the holes can become blocked for instance with fat globules or ice crystals in the ice confection mix. This problem is not so severe that the process in unworkable but nevertheless its solution is advantageous. In this respect it has been found that it is advantageous for the ice confection to be passed through a second plate containing a multiplicity of holes prior to being extruded through the first plate. By this means, particularly when the second plate is removable for cleaning when required, the frequency with which the first plate is temporarily not usable because of blocking of its holes is much reduced. Preferably the holes in the second plate are smaller than the holes in the first plate.

A further advantage is that the second plate reduces residual unevenness in the flow of the ice confection prior to the first plate. An advantage of using the first plate but particularly when used with a second plate is that ice confection can be extruded with comparatively even flow through an extruder head despite a large reduction or increase in cross-section of the extrusion passage over a short distance; in normal extrusion practice gradual outward tapering is practiced as mentioned above. The flow of the ice confection is preferably unimpeded between the two plates. The spacing between the two plates is, when the second plate is being used to reduce unevenness of flow, preferably less than 20 cms, particularly preferably less than 5 cms, and preferably not less than 0.5 cms. When the second plate is being used to reduce the tendency for the first plate to become blocked, the advantage gained from use of the second plate is only slightly less the further it is upstream in the extrusion process from the first plate. This is believed to be because the ingredients that can block the first plate are not generated during extrusion.

It will normally be convenient for the holes to approximate to circular or square in cross-section perpendicular to the flow but in principle any cross-sectional shape can be used. The holes can have considerable depth for instance when the array is made by punching holes in a die-plate. Preferably the surface area of each hole in the first plate is in the range displayed by 16 to 30 British Standard mesh. Preferably the holes are identical in area and shape. Within each plate all the holes should preferably show the same resistance to extrusion. This means that in general the holes in any one plate preferably should not differ significantly from each other in surface area. This can be expressed quantitatively by ignoring the extreme 5 % of the holes and then requiring that the surface area of the largest of the remaining holes should not be more than twice, particularly preferably not be more than 1.4 times, the surface area of the smallest hole.

As mentioned above, blocking of the holes in the first plate can be a problem. Use of a second plate upstream from the first plate helps to reduce this problem. It has further been found that such blocking can be reduced by ensuring that the extruded ice confection has an overrun greater than 20%, particularly preferably greater than 60%. (Overrun is defined as the percentage increase in volume of the aerated product at normal pressure compared with the volume of the unaerated mix before aeration.) It has also been found that the risk of blocking of the holes can be reduced by heating the first plate, preferably by induction heating, so that any ingredient of the ice confection that sticks is softened and tends to pass through the plate. Any of these techniques (a second plate, overrun and heating the first plate) can be used separately or in any combination to help reduce the problem of blocking of the holes in the first plate.

To reduce the risk of distortion of the shape of the ice confection after extrusion, the ice confection is perferably extruded vertically downwards. This is particularly significant when the ice confection is extruded with a finely defined cross-section and especially when the extruded ice confection contains longitudinal air passages.

Ice cream is an ice confection to which the processes of the invention is preferably applied.

One aspect of the invention is an extruded ice confection prepared by a process according to the invention. An especial form is an ice confection containing at least one, preferably many, longitudinal air passages. A further aspect is a composite confection made by filling the air passages with another edible material such as a sauce, honey, chocolate, another ice confection different in taste, colour or texture, fruit salad or cream.

Another aspect is an ice confection freezer comprising a freezer unit connected to an extrusion head containing a first plate having a multiplicity of holes through which the ice confection can be extruded, each hole having a minimum surface area perpendicular to the extrusion flow in the range displayed by the holes in 5 to 80 British Standard mesh. In a particularly form the plate is at the extrusion end of the extrusion head and the holes are in the form of an array and are closely spaced at least to their nearest neighbour, which array is not similar in cross-section to the extrusion end of the extrusion head. The advantages of this particular form are described above in relation to the corresponding preferred form of the process. Preferred forms of the freezer will be apparent from the description of the process of the invention but particularly preferred forms include a freezer comprising means for heating the first plate; and a freezer comprising a second plate which second plate is removable, is upstream from the first plate, contains a multiplicity of holes, particularly when the holes in the second plate are smaller than the holes in the first plate, and preferably is spaced less than 20 cms from the first plate.

A further aspect of the invention is an extrusion head comprising a first plate at the extrusion end of the head, the plate containing a multiplicity of holes in the form of an array and closely spaced at least to their nearest neighbour, each hole having a minimum surface area perpendicular to the extrusion flow in the range displayed by the holes in 10 to 80 British Standard mesh, which array in cross-section is not similar to the extrusion end of the extrusion head. The advantages and preferred modifications of such an extrusion head are fully indicated in the above discussion of the process and of the freezer. It should however be noted that the extrusion head is not only useful in the extrusion of ice confections. Part of this aspect of the invention lies in the appreciation that such an extrusion head has the described advantages in the extrusion of any viscous material which expands on release from extrusion pressure and which has to have a finely detailed cross-section when extruded.

The invention has been described in relation to British Standard meshes. The relationship between British Standard meshes and other meshes is given for instance at page 3118 in The Handbook of Chemistry and Physics, 39th Edition (1957 –1958), Chemical Rubber Publising Co, e.g.

| British Standard Mesh | Length of each side of square hole in mms |
|---|---|
| 5 | 3.353 |
| 10 | 1.676 |
| 16 | 1.003 |
| 80 | 0.187 |

The invention is concerned with extrusion during the preparation of ice confections. Other process steps in the preparation of ice confections need not be modified. It is difficult to summarize all the process steps that could be involved. For details of conventional process steps and of conventional formulations reference can be made to Ice Cream, by Arbuckle, AVI Publication Co. Inc. Westport, Conn., USA, 1972. In one conventinal process for preparing an ice cream confection, a mix of the ingredients is made and is then homogenized and pasteurized. The homogenized and pasteurized mix is then aerated and partly frozen in a freezer unit incorporating a beater. The stiff aerated and partly frozen product is extruded and then given adequate structure by hardening at very low temperatures (-30° C air temp.). The extruded ice confection is usually cut into bars before hardening but this can occur during or after hardening. It will be appreciated that the inventive process is applicable but not exclusively applicable to such a process.

The FIGS. are diagrammatic representations of equipment that can be used in processes according to the invention.

FIG. 1 exemplifies a freezer according to the invention. A freezer unit 1 of any conventional type, in particular one containing a beater, is connected by means of a feed-pipe 2 to an extrusion head. In the extrusion head a gradually tapering portion 3 is connected to a wide extrusion portion of uniform cross-section terminating in the extrusion end 5 of the extrusion head. A plate 4 containing a multiplicity of holes is across the extrusion end 5. The extrusion head is conventional except for the plate 4. The extrusion end conventionally will be rectangular in cross-section but more conveniently, since it avoids the difficulty of tapering 3 from the circular pipe 2 to a rectangular cross-section, is circular.

Figure 2:
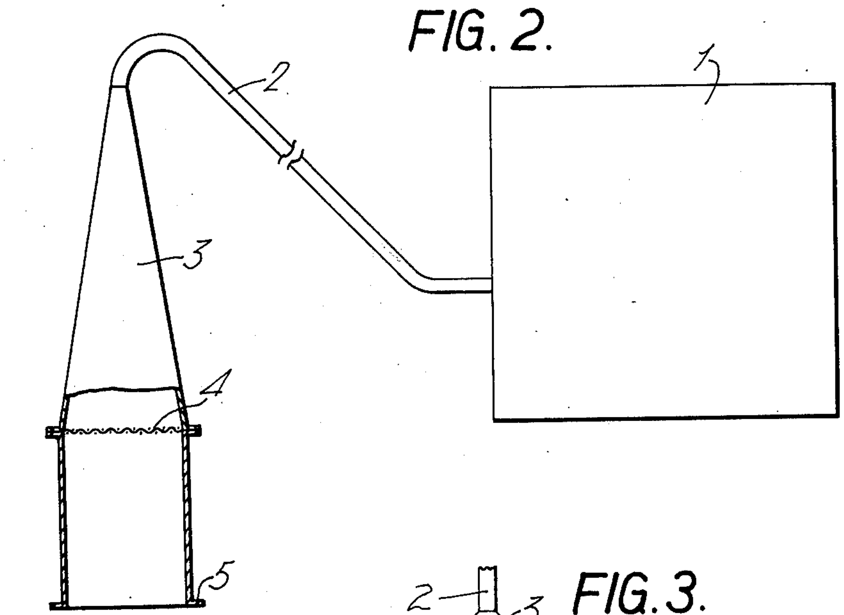

FIG. 2 shows a similar freezer to that shown in FIG. 1 except that the extrusion end 5 is open and the plate 4 is further upstream.

Figure 3:
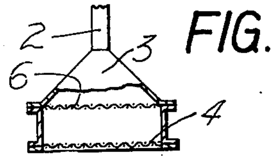

FIG. 3 shows an extrusion head according to the invention. A feed-pipe 2 leads to a sharply ,apering portion 3 connected to a portion of uniform cross-section terminating in an extrusion end across which is situated a first plate 4 containing a multiplicity of holes. Upstream from the first plate 4 is situated a second plate 6 also containing a multiplicity of holes.

FIG. 4 illustrates the types of plates that can be used in the invention. It will be noted that the outline of the array in FIG. 4 c and the outline of the array in FIG. 4 g are similar to the rectangular plate and thus similar to the conventional rectangular extrusion end of an extrusion head, across which the plate is designed to be fixed. However, the cross-sections of these arrays contain areas containing no holes and so are not similar to the conventional rectangular extrusion end. It should be noted that the areas across which extruded material will coalesce are not treated as distinguishing when condidering whether an array has a cross-section similar to that of an extrusion end.

The plate of FIG. 4 *a* will produce a squat U-shaped bar. The plates of FIGS. 4*b* and 4*f* will produce a cylindrical bar with a comparatively small air passage down the middle. The plate of FIG. 4*c* will produce a bar containing many parallel air passages. The plate of FIG. 4*d* will produce a conventional rectangular bar but avoids the problem of tapering a circular feed-pipe to a rectangular nozzle. The plate of FIG. 4*e* will produce a heart-shaped bar. The plate of FIG. 4*g* will produce a rectangular bar containing a rectangular passage down its centre.

Figure 4A:
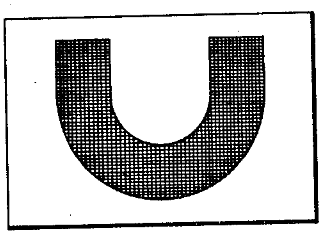
Figure 4B:
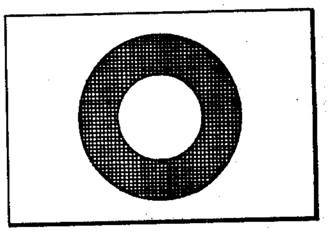
Figure 4C:
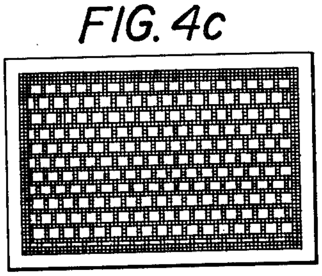
Figure 4D:
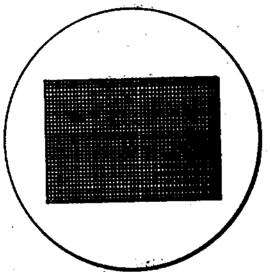
Figure 4E:
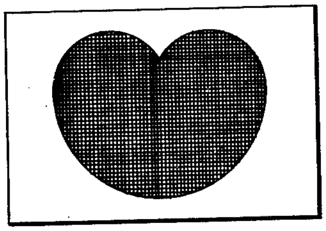
Figure 4F:
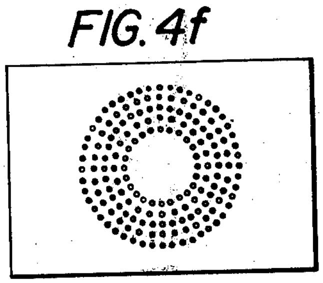
Figure 4G:
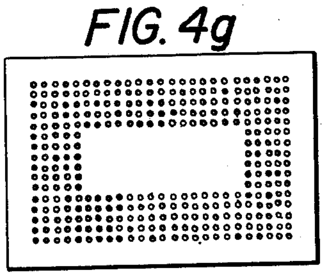
Figure 5:
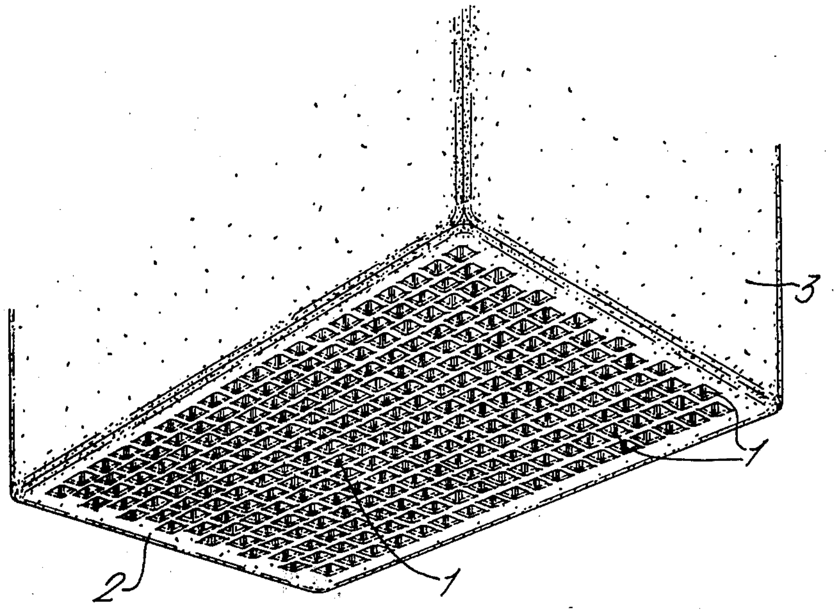

FIG. 5 illustrates a bar made using a plate of the type shown in FIG. 4*c*. Air passages 1 are surrounded by a support-region 2 and are parallel to sides 3.

An ice cream of the structure shown in FIG. 5 was prepared as follows using a freezer as shown in FIG. 1 using a British Standard 16 mesh patterned, by blocking-off, to give an array closely resembling the array shown in FIG. 4*c*. The formulation of ice cream mix was:

| | % by weight |
|---|---|
| Spray-dried skim milk powder | 9.5 |
| Sucrose | 15 |
| Maltodextrin 40DE (dextrose equivalent) | 2.0 |
| Palm oil | 9.5 |
| Monoglycerides (emulsifier) | 0.5 |
| Locust Bean Gum | 0.175 |
| Salt | 0.05 |
| Flavour and Colour | 0.1 |
| Water to 100% | |

The solid ingredients were mixed with water and heated to 65° C. The palm oil and emulsifier were then added and the total mix still at 65° C was homogenised, a conventional two-stage homogenisation, and then pasteurised by being heated at 85° C for 15 secs. The mixture was then cooled to 4° in a plate heat exchanger and aged for 2 hours with gentle agitation. The aged mix was frozen to –5° C and aerated to 110% overrun in a conventional freezer unit (Crepaco Freezer type KRIM 18 - 3163) containing a beater. The frozen mix was then extruded. The flow rate was 2 kg/ minute. The extrusion temperature was between –3.7° C and –4.2° C. The pressure drop across the mesh was slightly less than ⅓ atmosphere. The extruded log was cut into bars at the extrusion face by a wire drawn across the face of the mesh. The bars obtained were hardened by storage in a room with an air temperature of –30° C. The bars obtained closely resembled the bar shown in FIG. 5 in appearance.

We claim:

1. A process for producing an extruded ice confection of fancy cross-section comprising extruding an ice confection through a secondary plate prior to extruding through a primary plate, said primary plate being located at the open end of an extrusion head and having a multiplicity of holes arranged in an array which defines the cross-section of the extruded ice confection, and said holes each having a surface area in the range of about $(0.187\ mm)^2$ to about $(3.353\ mm)^2$, and said secondary plate having a multiplicity of holes which are smaller than the holes of the primary plate.

2. The process according to claim 1 in which the spacing between the two plates is in the range 0.5 to 20 centimeters.

3. An ice confection freezer consisting essentially of a freezer unit connected by a feed-pipe to an extrusion head having 1. a primary plate located at the open end of the extrusion head, said primary plate having a multiplicity of holes arranged in an array which defines the cross-section of the extruded ice confection, and said holes each having a surface area in the range of about $(0.187\ mm)^2$ to about $(3.353\ mm)^2$, and
2. a secondary plate located between the feed-pipe and the primary plate, said secondary plate having a multiplicity of holes which are smaller than the holes of the primary plate.

4. The freezer according to claim 3 in which the spacing between the two plates is in the range 0.5 to 20 centimeters.

5. The process according to claim 1 in which the array is not similar in shape to the open end of the extrusion head.

6. The freezer according to claim 3 in which the array is not similar in shape to the open end of the extrusion head.

* * * * *